United States Patent

[11] 3,539,070

| [72] | Inventor | John V. Dunlea, Jr.<br>62 Wellesley Ave., Wellesley,<br>Massachusetts 02181 |
|---|---|---|
| [21] | Appl. No. | 738,577 |
| [22] | Filed | June 20, 1968 |
| [45] | Patented | Nov. 10, 1970 |

[54] AIR RESCUE EQUIPMENT
4 Claims, 4 Drawing Figs.

[52] U.S. Cl. ............................................. 220/8, 244/1
[51] Int. Cl. ............................................. B65d 7/24
[50] Field of Search ............................................. 220/8; 244/1, 137, 137(D); 9/14; 294/(Inq); 214/(Inq)

[56] References Cited
UNITED STATES PATENTS

| 2,260,802 | 10/1941 | Conrad | 220/8X |
| 2,827,004 | 3/1958 | Luce | 220/8X |
| 2,969,210 | 1/1961 | Richardson | 244/137(P)UX |

FOREIGN PATENTS

| 488,435 | 7/1938 | Great Britain | 220/8 |

Primary Examiner—George E. Lowrance
Attorney—Morse, Altman & Oates

ABSTRACT: A collapsible air rescue chamber is provided for retrieving personnel in safety from enemy-controlled territory and is particularly adapted for use in combination with hovering aircraft such as helicopters. The chamber preferably is fabricated in telescopic sections of a lightweight, bulletproof material and suspended from the helicopter by which it is adapted to be raised or lowered from the ground and to hold at least one person in safety as he is retrieved.

Patented Nov. 10, 1970

INVENTOR
JOHN V. DUNLEA, JR.
BY
*Morse, Altman & Oates*
ATTORNEYS

INVENTOR
JOHN V. DUNLEA, JR.
BY Morse, Altman & Oates
ATTORNEYS

INVENTOR
JOHN V. DUNLEA, JR.
BY
ATTORNEYS

AIR RESCUE EQUIPMENT

BACKGROUND OF THE INVENTION

1. Field of the Invention

This invention relates generally to escape devices and more particularly is directed towards a protective chamber for use by helicopters or the like in recovering persons from the ground.

2. Description of the Prior Art

In modern warfare, there is an ever growing use made of aircraft and particularly significant is the greatly expanded use of helicopters. One of the main uses of the helicopter is as a rescue craft for recovering downed pilots as well as other personnel who may find themselves in enemy-controlled territory. Heretofore, the practice has been either to land the helicopter and pick up the personnel directly or to lower a sling on the end of a line and thereby raise him up to the helicopter. Both of these techniques are unsatisfactory since the helicopter by landing exposes itself to ground fire for an undesirable length of time and the person on the ground must also expose himself as he approaches the aircraft. Similarly, if a sling is employed the person in the sling is exposed to enemy fire until he is fully retrieved or until the helicopter has moved clear of the zone. Accordingly, it is an object of the present invention to provide equipment for use particularly by helicopters in rescuing ground personnel in safety, protected from enemy fire and in the shortest possible time.

SUMMARY OF THE INVENTION

This invention features rescue equipment for use by a helicopter or the like, comprising a collapsible chamber of a bulletproof or bullet-resistant material, connected to the helicopter by a suspension line and of a size sufficient to accommodate at least one person. In the preferred mode, the chamber is made up of a number of spring-balanced telescopic sections depending from a domed main body portion. A platform is provided at the base to support one or more persons within the chamber. The device is adapted to be collapsed into a compact unit for storage within the helicopter when not in use and to be opened and closed quickly and easily by raising and lowering the telescopic sections.

DESCRIPTION OF THE PREFERRED EMBODIMENT

Figure 1:
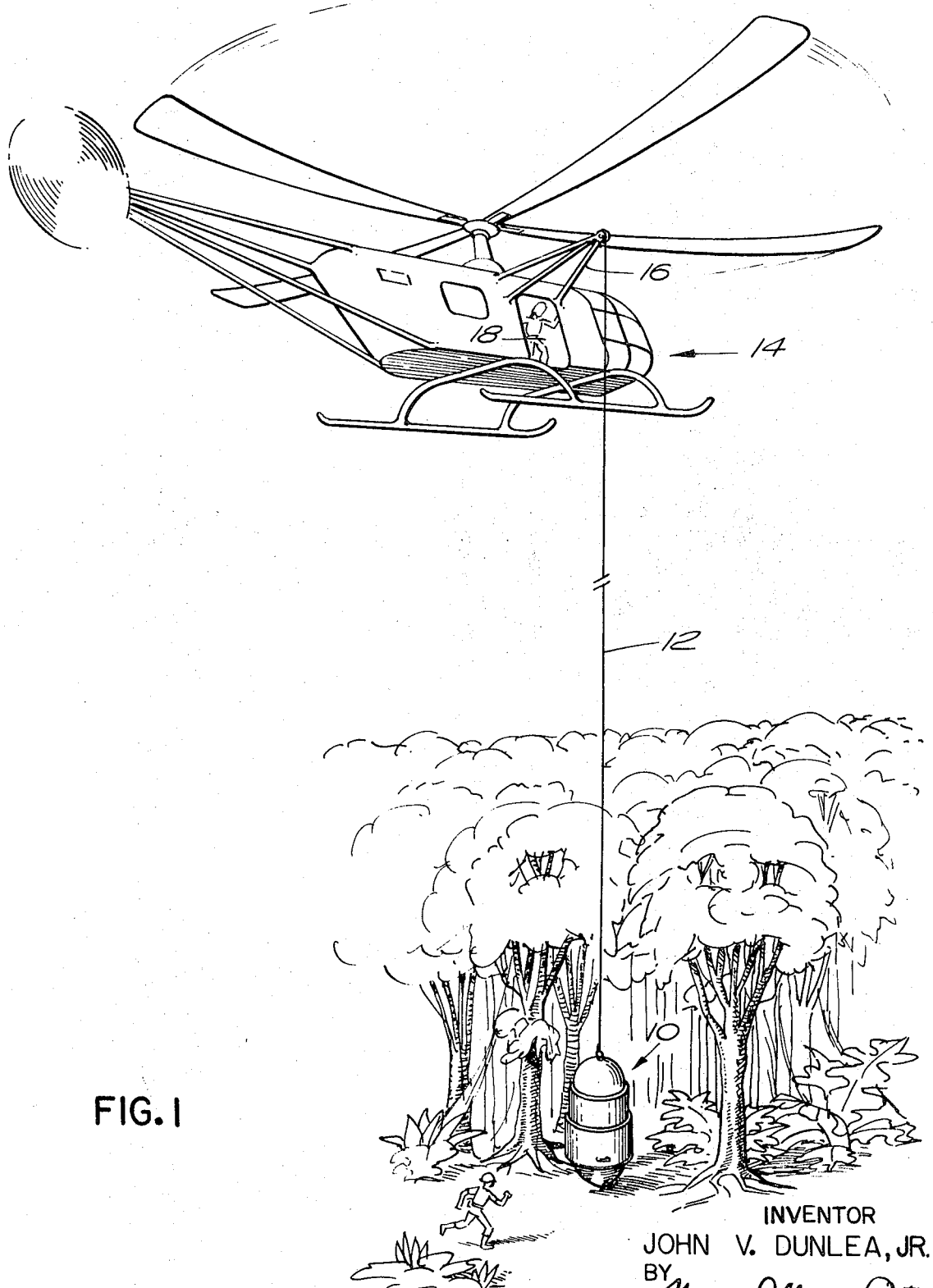
FIG. 1 is a view in perspective showing rescue equipment made according to the invention in typical use.

Referring now to the drawings and to FIG. 1 in particular there is illustrated a rescue chamber 10 suspended by means of a cable 12 from a helicopter 14 in a situation exemplifying typical use of the equipment. In practice, the cable 12 runs out over the end of a boom 16 fixed to the side of the helicopter opposite a door or hatch 18 through which personnel and the chamber 10 may be passed. A winch (not shown) is carried by the helicopter to operate the cable and thereby raise or lower the chamber 10 as required.

Figure 2:
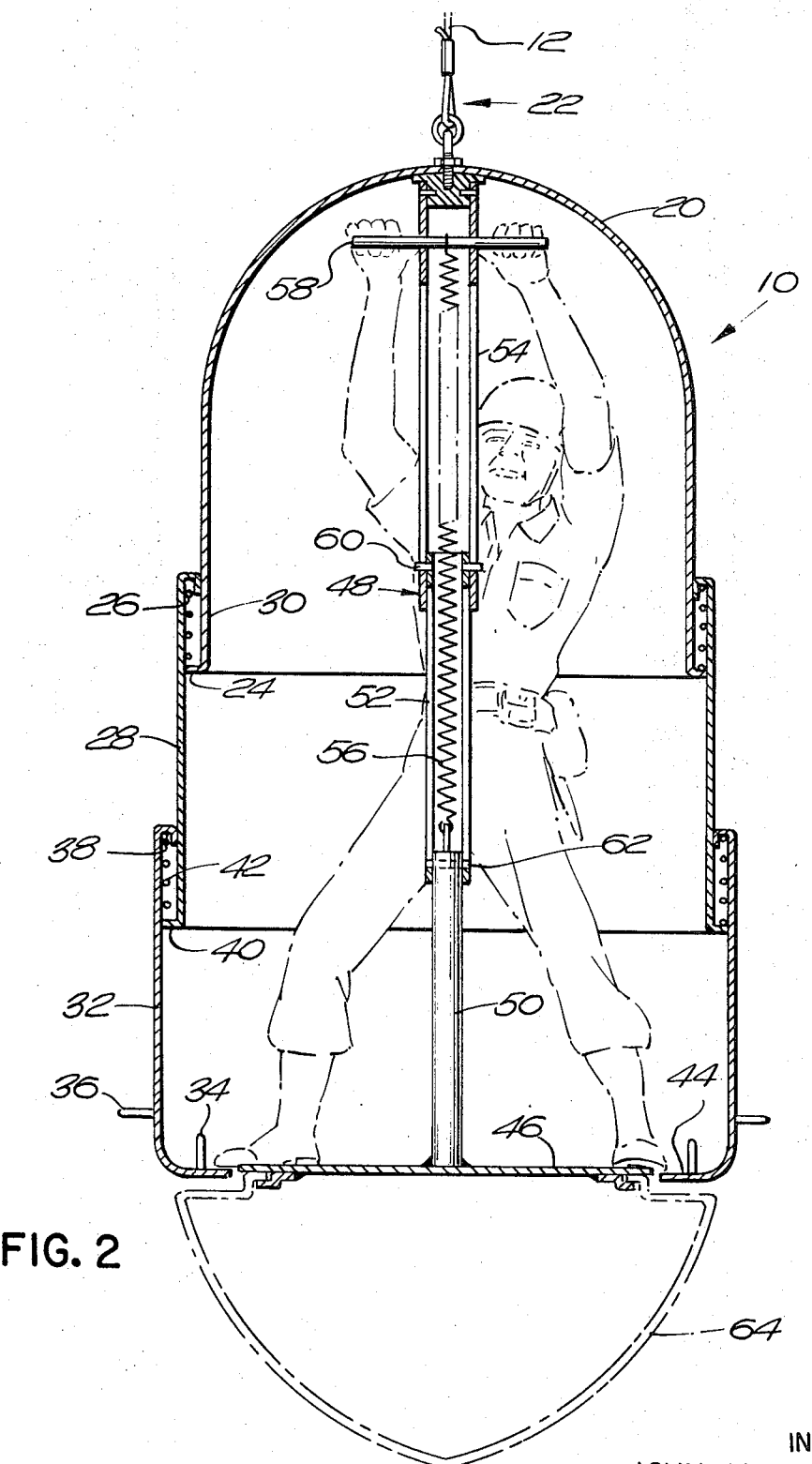
FIG. 2 is a sectional front elevation of the rescue chamber in closed and extended condition.
Figure 3:
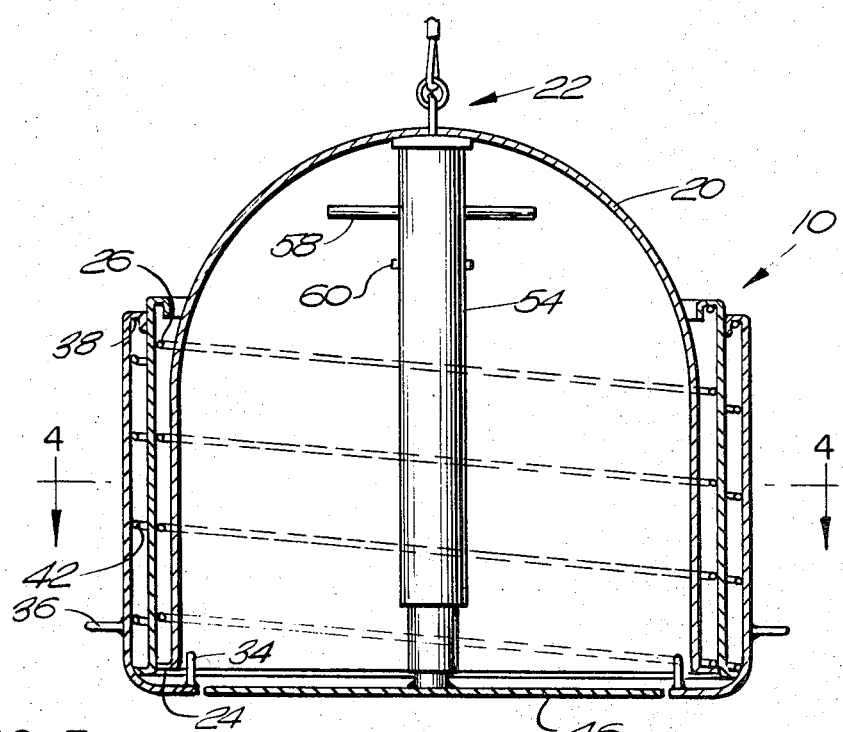
FIG. 3 is a view similar to FIG. 2 showing the chamber in a collapsed condition; and, FIG. 4 is a cross-sectional view taken along the line of 4—4 of FIG. 3.
Figure 4:
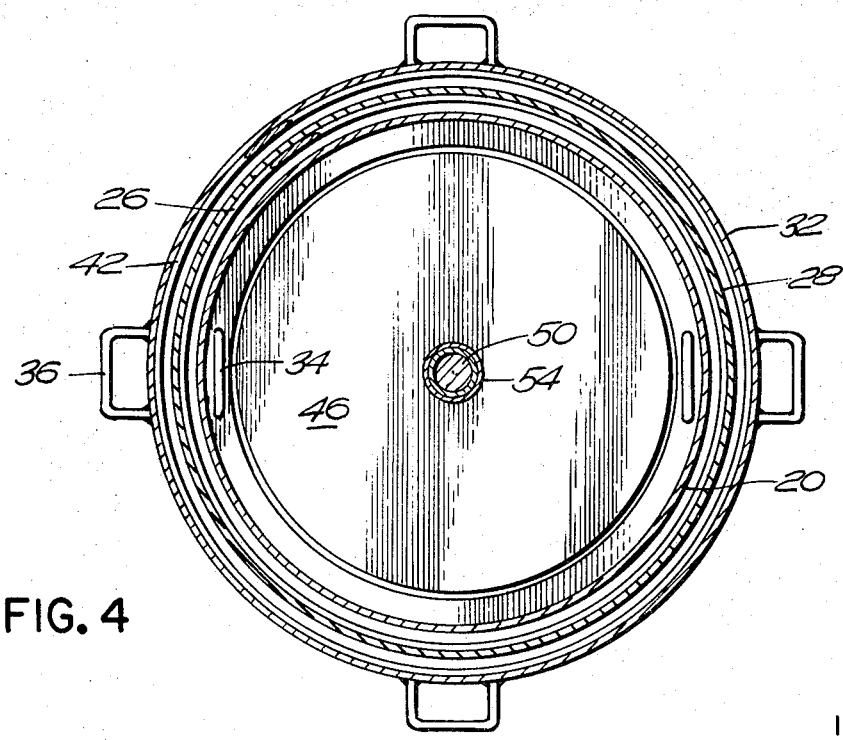

Referring now more particularly to FIGS. 2, 3 and 4, the chamber 10 will now be described in detail. In the preferred embodiment, the chamber 10 is generally organized about a domed main body portion 20 connected by a shackle 22 to the cable 12 and fabricated from a bulletproof or bullet-resistant material which is preferably light in weight. For this purpose the material such as that sold under the trademark NOROC by Norton Co., of Worcester, Massachusetts, may be employed to advantage. This material is a laminated product comprised of layers of woven nylon and fibreglass bonded to opposite faces of a boron core. The material is relatively light in weight and capable of withstanding the impact of bullets. Other materials and compositions may also be employed. The material may be molded, cast or otherwise formed into the domed configuration of the body portion 20.

The body portion will be seen to be formed with an outwardly extending annular flange 24 which cooperates with an inner annular downwardly facing channel 26 formed about the upper edge of an annular telescopic section 28 preferably fabricated from the same material employed for the main body portion 20. The section 28 is dimensioned to fit in sliding engagement with respect to the main body portion so they may be telescoped upwardly or downwardly without binding. Mounted between the flange 24 and the channel 26 is a relatively large, heavy spring 30 wound completely about the main body portion 20 for several convolutions. The spring is of sufficient strength to serve as a counterbalance for the section 28 as well as for a lowermost section 32 which telescopically engages section 28. The spring 30 is of sufficient strength that the combined weight of sections 28 and 32 is just sufficient to overcome the force of the spring so that the sections will remain normally in their downward positions as shown in FIG. 2. However, the spring force is such that the telescopic sections may be raised easily by merely applying a slight upward pressure to the sections. For this purpose inner and outer handles, 34 and 36 respectively, are provided on the lowermost section 32.

Section 32 will be seen to be of slightly greater diameter than section 28 and is formed with a downwardly facing inner channel 38 similar to that of channel 26 of the section 28. A flange 40 is formed about the lower margin of the section 28 which cooperates with the channel 38 for mounting a spring 42 of sufficient strength to counterbalance the weight of the lowermost section 32. Section 32 is also formed with an inwardly extending lip 44 the inner edge of which terminates in closely spaced relation to the outer periphery of a circular platform 46 which supports a person standing within the chamber. The section 32 preferably is fabricated from the same material employed for the main body portion 20.

The platform 46 is mounted to the lower end of a telescopic column 48, the upper end of which is secured to the top of the domed body section 20. The column typically is made up of three telescopic sections 50, 52 and 54 with a counterbalancing spring 56 mounted within the upper two sections. The lower end of the spring engages the upper of the section 50 and the upper end of the spring engages a crossbar 58 which also serves as a handhold for the occupant. The spring is selected to be of sufficient strength such that the weight of the column will overcome the strength of the spring but will facilitate collapsing the column when desired. Guide pins 60 and 62 are employed to ride in longitudinal slots formed in the sections 52 and 54 to prevent twisting and turning of the column sections and the platform. The platform 46 preferably is fabricated from a bulletproof material such as steel or the same material employed for the body portion 20.

Shown in phantom in FIG. 2 as an accessory item is a removable domed-shaped base 64 which may be provided for use particularly in jungle areas to facilitate downward movement of the chamber 10 through trees, brush and the like. The base 64 is detachably connected to the platform 46 and may be fabricated of a strong but light weight material such as aluminum or the like, and need not be bulletproof since the occupant is fully protected. In normal conditions the base 64 would not be used since it would be preferable to have the chamber 10 stand upright on the flat platform 46.

The chamber is used normally in the closed and extended condition shown in FIG. 2 with all telescopic sections down and the column 48 extended so that a person may stand upright, fully enclosed and protected. The chamber is lowered from the helicopter in the closed condition and the party on the ground merely grasps the external handle 36 raising the telescopic section sufficiently to permit him to step inside. The chamber will then close by itself with the person standing on the platform and preferably grasping the crossbar 58. The chamber is then drawn up to the helicopter which may also be moving forwardly. When the chamber is level with the hatch 18 the chamber may then be opened, either by the person inside pulling up on the handle 34 or by personnel on board the helicopter grasping the handle 36. The chamber occupant may then step from the chamber to the helicopter. If no further use is to be made of the chamber, it may be collapsed into the condition shown in FIG. 3 by raising the sections 28 and 32 as well as telescoping the column 48 so as to greatly reduce the size of the chamber and permit its convenient storage within the helicopter.

While the invention has been described with particular reference to the illustrated embodiment, it will be understood that numerous modifications thereto will appear to those skilled in the art. For example, the telescopic sections may be arranged differently so that the lowermost section is mounted within the middle section and the middle section within the main body portion. Also in place of a single spring between each section, a number of smaller springs may be employed mounted on rods which slidably engage each of the sections. Also the number of sections may be increased or decreased as desired. In place of the springs as a counterbalancing force, the chamber section may be held in a normally raised position by a release mechanism which could be operated by the occupant as soon as he is under the domed main body portion. Preferably this release mechanism could be connected to the crossbar 58 and when released would allow the telescopic sections to drop down enclosing the occupant. The telescopic sections could subsequently be raised by manual means or by means of suitable power-hoisting arrangement such as a pulley system, or its equivalent. Also various materials may be employed which are suitable for protecting the occupant. Preferably the material should be as light in weight as possible and at the same time sufficiently strong to protect the occupant from ground fire. Accessory equipment such as a voice communication system between the helicopter and the chamber may be easily provided.

I claim:

1. Air rescue equipment for use by helicopters or the like, comprising:
   a. a chamber fabricated from a bullet-resistant material;
   b. said chamber being formed with a fixed tubular portion and at least one relatively movable tubular portion telescopically connected thereto;
   c. means for suspending said chamber from said helicopter;
   d. said movable portion being formed with an open end providing access to said chamber in one position and enclosing said chamber in another position;
   e. an elongated member extending from said fixed portion through said movable portion towards the open end thereof; and,
   f. a platform mounted to said member dimensioned to close said open end when said open end is aligned with said platform.

2. Air rescue equipment according to claim 1 wherein said elongated member is telescopically connected to said fixed portion.

3. Air rescue equipment according to claim 1 including spring means connecting said fixed and movable portions to counterbalance the weight of said movable portion.

4. Air rescue equipment according to claim 1 including a domed base detachably mounted to said platform.